R. C. LEE.
WORK HOLDING STAND.
APPLICATION FILED JULY 26, 1918.
1,341,809.
Patented June 1, 1920.
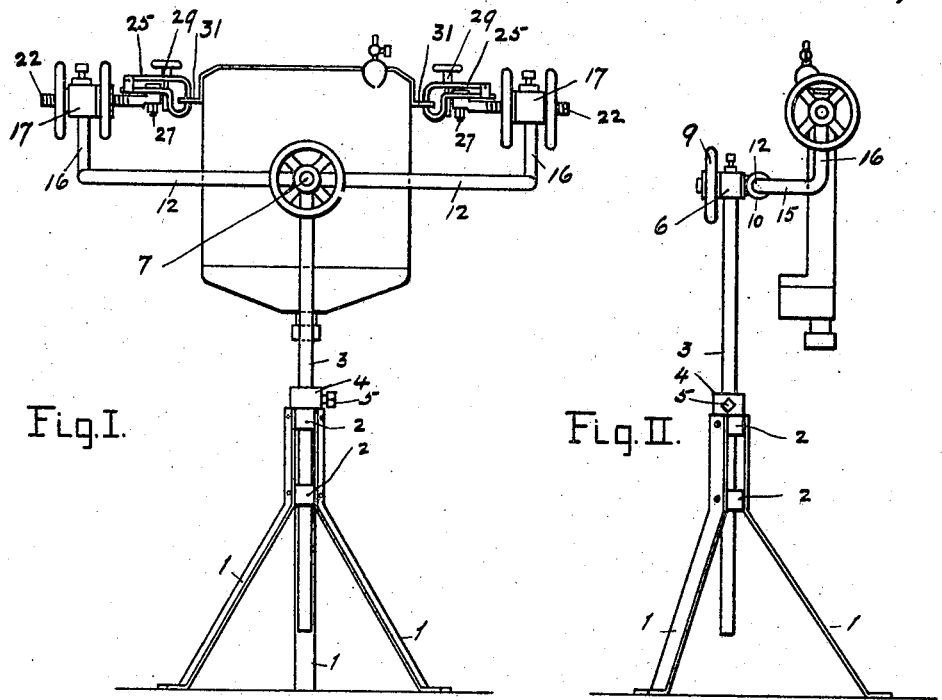
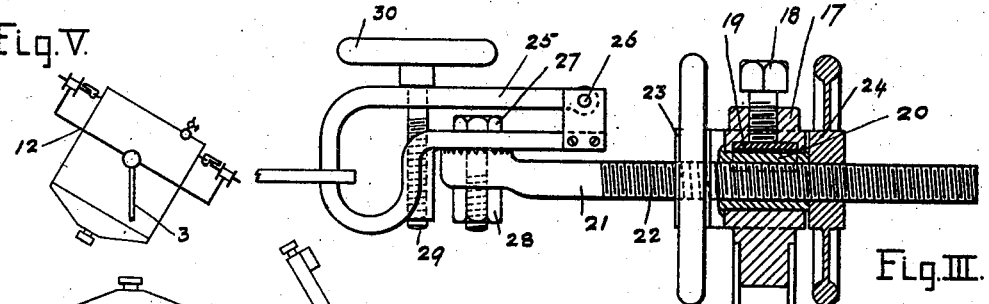
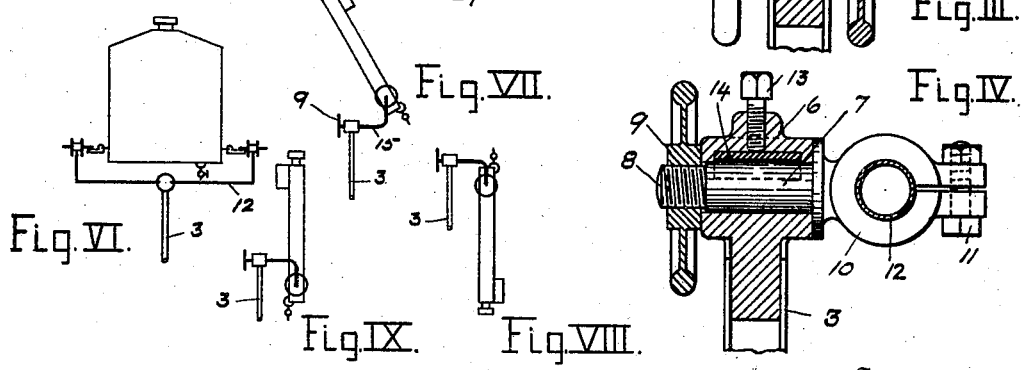
Inventor
Robert Cyrus Lee
By Arthur Scrivenor
Attorney

UNITED STATES PATENT OFFICE.

ROBERT CYRUS LEE, OF RICHMOND, VIRGINIA, ASSIGNOR TO ARTHUR SCRIVENOR, OF RICHMOND, VIRGINIA.

WORK-HOLDING STAND.

1,341,809.  Specification of Letters Patent.  Patented June 1, 1920.

Application filed July 26, 1918. Serial No. 246,904.

*To all whom it may concern:*

Be it known that I, ROBERT CYRUS LEE, a citizen of the United States of America, residing at Richmond, in the county of Henrico and State of Virginia, have invented certain new and useful Improvements in Work-Holding Stands, of which the following is a specification, reference being had therein to the accompanying drawing.

My invention relates to improvements in work-holding stands which are adjustable vertically and in horizontal and vertical planes, and it particularly relates to stands for holding radiators of automobiles; and it has for its object to provide an adjustable stand in which an automobile radiator may be securely supported and by means of which the position of the radiator may be so changed that any part or surface of the said radiator may be presented to the workman.

This object I attain by the mechanisms and arrangements illustrated in the accompanying drawings, in which—

Figure I shows the stand in elevation, and supporting an automobile radiator; Fig. II is a side view of the stand, and supporting a radiator; Fig. III is an enlarged detail, partly in section, of one of the clamps by which the radiator is supported; Fig. IV is an enlarged view, partly in section, of the swivel joint at the head of the stand. Figs. V, VI, VII, VIII and IX show some of the many positions in which the radiator may be held in the stand. Similar numerals refer to similar parts throughout the several views.

In Figs. I and II, 1, 1, 1, are the legs of a tripod stand supporting the sleeves 2, 2 in which slides the vertical rod 3, the height of which in the sleeves can be adjusted by means of the movable collar 4, which is secured by the set-screw 5.

At the upper end of the rod 3 is a head 6, in which is journaled the stud or pin 7 (see Fig. IV) having at one end the threaded portion 8 which is provided with a clamping nut 9. This nut is shown in the form of a hand-wheel with a threaded hub. At the other end the stud is provided with the clamping jaws 10, which may be tightened by means of the bolt 11. The clamping jaws are bored to receive a work holding arm 12, shown in Figs. I and II, and also shown in Fig. IV in section as being hollow. In the top of the head 6 there is a set-screw 13 which bears upon a pressure plate 14, which in its turn presses upon the stud 7. The set-screw and pressure plate form a means of putting pressure upon the stud 7 so as to act as a brake, allowing the stud to be turned in the head 6, but yet preventing accidental displacement. Positive locking of the stud is quickly accomplished, after it has been turned into the desired position, by means of the clamping nut 9.

The arm 12 is supported at its middle in the clamping jaws 10. At either end the arm is bent at right angles to the portion passing through the head 6, the said bent portions being designated in the drawings by the numeral 15. At the end of the portions 15, 15 the arm is bent upwardly, as at the vertical portions 16, 16, which portions terminate in the bosses 17, 17.

A detail of one of these bosses 17, with the adjustable rod and clamp for supporting the radiator, is shown in Fig. III, in which 18 is a set-screw bearing upon a pressure plate 19, which in its turn bears upon a bushing 20. This bushing is collared at one end, and at the other end extends slightly beyond the boss 17. Through the bushing there passes the rod 21, having the threaded portion 22, on which are mounted two clamping nuts 23 and 24, the former being adjacent to the collared end of the bushing 20, and the latter adjacent to that end of the bushing which projects beyond the boss 17. By manipulating the two clamping nuts 23 and 24 the amount of projection of the rod 21 through the bushing 20 can be regulated; and as soon as adjusted it is clamped firmly in place, relative to the bushing, by means of the clamping nuts 23 and 24. But the bushing may yet be free to revolve in the boss 17. The revolution of the bushing in the boss may be controlled by means of the pressure plate 19 and set-screw 18.

Supported at one end of the rod 21 are a pair of hinged clamping jaws 25, hinged at 26. The jaws 25 are pivoted on and secured to the rod 21 by means of the bolt 27, with nut 28. The contacting surfaces of the jaws 25 and the arm 21 may be roughened or cut in the shape of teeth to guard against accidental movement should the bolt 27 not have been tightened sufficiently.

The upper and lower jaw of the pair of jaws 25 are brought together with pressure by means of the screw 29, which may be provided at its upper end with a small handwheel 30 for quick and easy manipulation.

Referring to Fig. I, it is seen that the radiator is provided with two ears or lugs 31. This form of ear, projecting sidewise from the radiator, is used in some cases; while in other cases the ear or lug may project in other directions or be otherwise disposed. It is for this reason that the clamping jaws 25 are swiveled at 27; so that practically any form or make of radiator may be supported in the stand.

To support the radiator the screw 29 is slackened, the jaws 25 are separated, the lugs 31 are inserted between the jaws and the said jaws are again tightened by means of the screws 29. As all radiators are not of the same width, and as raditor lugs are not at the same distance apart, adjustment of the distance between the two sets of clamping jaws 25 is necessary, and this adjustment is obtained by means of the threaded portion 22 of the rod 21, with the clamping nuts 23 and 24.

By means of the swivel joint in the stand head 6 and of the swivel joints in the arm bosses 17 the supported radiator may be thrown into any position, the vertical height of the work above the floor being adjusted when necessary by sliding the rod 3 in the sleeves 2 of the tripod stand. In Fig. I the radiator is shown suspended with the radiator cap downward, and drain upward. The back of the radiator is next to the stand, and the workman would be working on the opposite side, that is, on the face side of the radiator, which would be to the right in Fig. II. Should he wish to work directly on the face of the radiator he simply swings the cap end or top of the radiator upward toward him, securing it in position by means of the set-screws in the bosses 17. Should he wish to work on the top face of the radiator he swings the whole arm in a vertical plane about the minor axis of the arm which is the stud 7 in the stand head 6, as indicated in Fig. V. If instead of rotating the arm at the stud 7, the workman throws the radiator into a vertical position by rotating it on the bushing 20, the back of the radiator will be then presented to him, as indicated in Fig. VI and Fig. VII. Figs. VIII and IX show how the back or front may be presented to the workman with the vertical portions 16 of the arm 12 pointing downward, that is, the arm having been rotated at the stud 7 in the rod head 6.

Many operations have to be performed upon an automobile radiator, in the way of repairs, and on many different parts of its surface; and the repairing of a radiator, as usually carried out, takes much time, due to the weight and shape of the radiator and the awkwardness in handling it. With the radiator supported in my work-stand it may be quickly swung into and held in any desired position, so effecting a very large saving of time, reducing the number of tools and other material required, and leaving the workman free to apply himself directly to the point of repair.

I claim as my invention:

1. Work supporting means including a support, a work holder bodily fulcrumed on said support to turn in two planes at substantially right angles to each other, and work clamping means on said holder, said means being adapted to turn in two planes at right angles to each other.

2. Work supporting means including a support, a work holder bodily fulcrumed on said support to turn in two planes at substantially right angles to each other, work clamping means on said holder, and means for adjusting said work clamping means, the latter being adapted to turn in two planes at right angles to each other.

3. Work supporting means including a support, a rod vertically adjustable in the support and rotatable about its major axis, an arm attached to the rod and rotatable about its minor axis, a work-holding device attached to each end of the arm and rotatable in a plane normal to the plane in which the arm is rotatable.

4. Work supporting means including a support, an arm journaled on the support and rotatable in vertical and horizontal planes, and a work-holding device attached to each end of the arm and rotatable in a vertical plane normal to the vertical plane of rotation of the arm.

5. Work supporting means including a support, an arm journaled about its middle on the support and rotatable about its minor axis, means for securing the arm, work-holding devices adjustably mounted on the arm, said devices being rotatable in a plane normal to the plane of rotation of the arm, and means for securing the work-holding devices.

6. Work supporting means including a support, a rod adjustably mounted on the support, an arm adjustably mounted on the rod and rotatable about its minor axis, and work-holding devices adjustably mounted on the arm and rotatable in a plane normal to the plane of rotation of the arm.

7. Work supporting means including a support, a rod vertically adjustable in the support and rotatable in a horizontal plane about its major axis, an arm attached to the rod and rotatable in a vertical plane about its minor axis, rods adjustably mounted on the arm, and clamping devices attached to the rods.

8. Work supporting means including a support, a work holder bodily fulcrumed on said support to turn in two planes at substantially right angles to each other, work clamping jaws, and supports for said jaws carried by said holder, said jaws and said supports being adapted to turn in planes at right angles to each other.

9. Work supporting means including a support, a work holder bodily fulcrumed on said support to turn in two planes at substantially right angles to each other, work clamping jaws, and independently adjustable supports for said jaws carried by said holder, said jaws and said supports being adapted to turn in planes at right angles to each other.

10. Work supporting means including a support, a rod vertically adjustable in the support and rotatable about its major axis, means for securing the rod, an arm journaled on the rod and rotatable about its minor axis, means for securing the arm, a work-holding device adjustably mounted at each end of the arm and so arranged that it may be rotated about axes at right angles to the minor axis of said arm, and means for securing the work-holding device.

11. Means for supporting an auto radiator in a plurality of positions including a support, an arm carried by said support and having a plurality of fulcra to permit turning of the arm in two planes at substantially right angles to each other, a work clamping jaw adjacent each end of said arm, and means for adjusting said jaws toward and from each other, said jaws having a plurality of turning points whereby they may be turned in planes at right angles to each other.

In testimony whereof I have hereunto affixed my signature in the presence of two witnesses.

ROBERT CYRUS LEE.

Witnesses:
HAROLD S. BLOOMBERG,
ARTHUR SCRIVENOR.